United States Patent
Raj et al.

(10) Patent No.: US 10,497,360 B2
(45) Date of Patent: Dec. 3, 2019

(54) PERSONALIZED ASSISTANCE SYSTEM BASED ON EMOTION

(71) Applicant: SONY CORPORATION, Tokyo (JP)

(72) Inventors: Ranjeet Ranjan Raj, Bangalore (IN); Madhvesh Sulibhavi, Bangalore (IN)

(73) Assignee: SONY CORPORATION, Tokyo (JP)

( * ) Notice: Subject to any disclaimer, the term of this patent is extended or adjusted under 35 U.S.C. 154(b) by 38 days.

(21) Appl. No.: 15/811,784

(22) Filed: Nov. 14, 2017

(65) Prior Publication Data

US 2018/0240454 A1    Aug. 23, 2018

Related U.S. Application Data

(60) Provisional application No. 62/461,440, filed on Feb. 21, 2017.

(51) Int. Cl.

| | |
|---|---|
| *G10L 13/04* | (2013.01) |
| *G10L 25/27* | (2013.01) |
| *G10L 25/63* | (2013.01) |
| *G06F 3/16* | (2006.01) |
| *G06K 9/00* | (2006.01) |

(52) U.S. Cl.
CPC ............ *G10L 13/043* (2013.01); *G06F 3/167* (2013.01); *G06K 9/00302* (2013.01); *G06K 9/00684* (2013.01); *G10L 25/27* (2013.01); *G10L 25/63* (2013.01)

(58) Field of Classification Search
CPC ....... G10L 13/043; G10L 25/27; G10L 25/63; G06F 3/167; G06K 9/00302; G06K 9/00684
See application file for complete search history.

(56) References Cited

U.S. PATENT DOCUMENTS

| | | | |
|---|---|---|---|
| 2002/0072900 A1 | 6/2002 | Keough et al. | |
| 2005/0273626 A1* | 12/2005 | Pearson | G06Q 20/32 713/186 |
| 2013/0159234 A1 | 6/2013 | Xing et al. | |
| 2014/0074504 A1 | 3/2014 | Nelson et al. | |
| 2015/0149179 A1* | 5/2015 | Korbecki | G10L 13/00 704/260 |
| 2015/0186154 A1 | 7/2015 | Brown et al. | |
| 2016/0150299 A1 | 5/2016 | Gilberton et al. | |

(Continued)

*Primary Examiner* — Michelle M Koeth
(74) *Attorney, Agent, or Firm* — Chip Law Group

(57) ABSTRACT

A personalized voice assistance system and method to provide a personalized emotion-based assistance to a first individual from a group of individuals are disclosed. The personalized voice assistance system detects an activity of the first individual in a first time period in a defined area. A requirement of an assistance for the first individual may be determined based on the detected activity in the defined area. The personalized voice assistance system may further compute, based on the detected activity, an emotional reaction of a second individual from the group of individuals. The emotional reaction of the second individual may be computed for the determined requirement of the assistance for the first individual. The personalized voice assistance system may further generate an output voice similar to the second individual based on at least the computed emotional reaction to assist the first individual.

22 Claims, 6 Drawing Sheets

(56) References Cited

U.S. PATENT DOCUMENTS

| | | | |
|---|---|---|---|
| 2016/0193732 A1* | 7/2016 | Breazeal | B25J 9/0003 |
| | | | 700/258 |
| 2018/0101776 A1* | 4/2018 | Osotio | G06N 5/04 |
| 2018/0181854 A1* | 6/2018 | Koukoumidis | G06N 3/006 |

* cited by examiner

PERSONALIZED ASSISTANCE SYSTEM BASED ON EMOTION

CROSS-REFERENCE TO RELATED APPLICATIONS/INCORPORATION BY REFERENCE

This application claims priority to U.S. Provisional Patent Application Ser. No. 62/461,440 filed on Feb. 21, 2017, the entire content of which is incorporated herein by reference.

FIELD

Various embodiments of the disclosure relate to a personalized assistance system. More specifically, various embodiments of the disclosure relate to a personalized voice assistance system based on emotion of an individual.

BACKGROUND

With the advent of digital convergence, it has become possible to facilitate communication between various devices that support different computing and information technologies. Such technologies may be related to multimedia content, communication networks, voice services, telephony services, data services, and/or location-based services. Such communication between the various devices may be based on shared resources and a synergistic interaction with each other.

In certain scenarios, such a digital convergence may facilitate a typical two-party command-response interaction between the various devices communicatively coupled with each other. In such a command-response interaction, a first party, such as a client, a slave, or an initiator, may initiate an interaction by issuance of a command in response to an input provided by a user. A second party, such as a server, a master, or a responder, may complete the interaction by providing an appropriate response to the issued command. However, in such scenarios, the interaction may be limited to a response that typically corresponds to the same domain as that of the issued command. Such an interaction may sound robotic, as it fails to mimic intelligent human-like responses with emotional reaction. Consequently, such an interaction may not enable the various devices to eloquently and emotionally converse with the user.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A personalized voice assistance system and method based on emotion is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
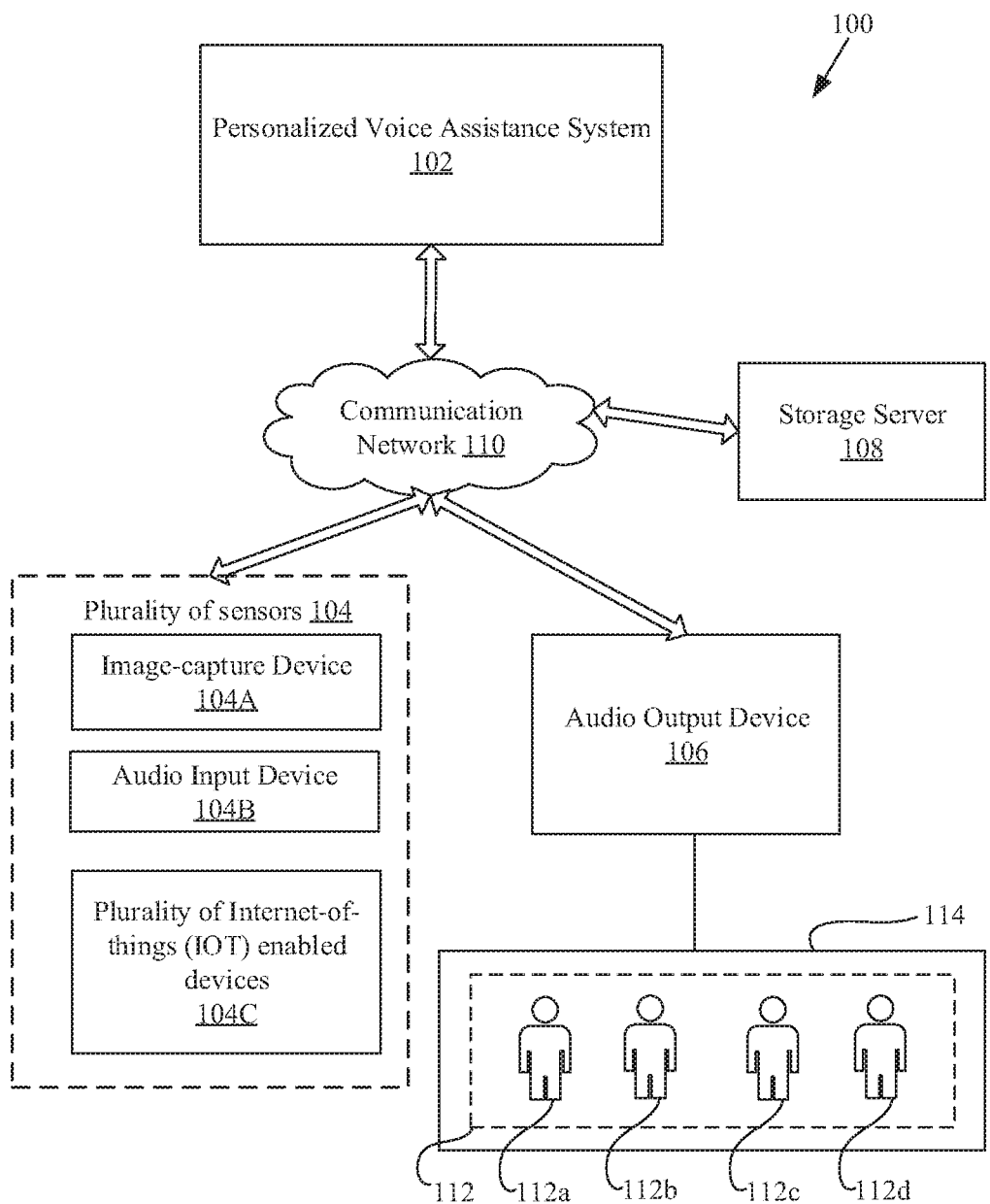
FIG. 1 is a block diagram that illustrates an exemplary network environment to provide a personalized emotion-based voice assistance to an individual, in accordance with an embodiment of the disclosure.

Various implementations may be found in a personalized voice assistance system and/or method to provide a personalized emotion-based voice assistance to an individual. Exemplary aspects of the disclosure may comprise a method to provide a personalized emotion-based voice assistance to an individual. The method may be implemented in a personalized voice assistance system that may include circuitry to provide the personalized emotion-based voice assistance to the individual. The personalized voice assistance system may communicate with at least one image-capture device and a storage server, via a communication network. The circuitry may be configured to detect an activity of a first individual from a group of individuals in a first time period in a defined area. The circuitry may be further configured to determine a requirement of an assistance for the first individual. The requirement of the assistance for the first individual may be determined based on the detected activity in the defined area. The circuitry may be further configured to compute an emotional reaction of a second individual from the group of individuals for the determined requirement of the assistance for the first individual. The emotional reaction may be computed based on the detected activity. The circuitry may be further configured to generate an output voice similar to the second individual. The output voice may be generated based on at least the computed emotional reaction to assist the first individual.

In accordance with an embodiment, the personalized voice assistance system may comprise a plurality of sensors configured to acquire one or more data items associated with the first individual. The circuitry may be further configured to receive, via a communication network, the acquired one or more data items from the plurality of sensors. The acquired one or more data items may comprise at least one image of the first individual and an audio stream associated with the first individual. The circuitry may be further configured to detect the activity of the first individual in real time or near-real time based on the one or more data items acquired by the plurality of sensors, in an absence of one or more remaining individuals of the group of individuals in the first time period in the defined area. The requirement for the assistance may be determined based on the absence of the one or more remaining individuals of the group of individuals in the first time period in the defined area. The output voice may be generated based on the absence of the one or more remaining individuals of the group of individuals in the first time period in the defined area.

In accordance with an embodiment, the circuitry may be further configured to analyze the detected activity of the first individual to determine whether the detected activity by the first individual is in accordance with at least one of usual activities of the first individual or a schedule plan of activities associated with the first individual. The personalized voice assistance system may further comprise a memory configured to store a first time constant which corresponds to a first time limit for completion of the analyzed activity by the first individual. The circuitry may be further configured to measure a first time duration taken by the first individual to complete the analyzed activity. The circuitry may be further configured to determine a time deviation parameter associated with the first individual based on a difference between the first time limit and the first time duration.

In accordance with an embodiment, the memory may be further configured to store a first data item which corresponds to a first baseline behavior pattern of the first individual. The circuitry may be further configured to determine a first behavior pattern exhibited by the first individual engaged in the analyzed activity. The circuitry is further configured to determine a behavior deviation parameter associated with the first individual based on a difference between the first baseline behavior pattern and the first behavior pattern. The circuitry is further configured to determine an emotional state of the first individual based on the analyzed activity, the determined time deviation parameter associated with the first individual, and the determined behavior deviation parameter associated with the first individual. The circuitry may be further configured to determine the requirement of the assistance for the first individual in the defined area based on the emotional state of the first individual, the time deviation parameter associated with the first individual and the behavior deviation parameter associated with the first individual.

In accordance with an embodiment, the circuitry may be further configured to identify the second individual from the group of individuals based on a dynamic association of the detected activity of the first individual with the second individual. The circuitry may be further configured to generate the output voice similar to the second individual based on a voice footprint of the second individual. The voice footprint of the second individual may be retrieved from the storage server, via the communication network. The voice footprint of the second individual may correspond to a second time period that precedes the first time period. The circuitry may be further configured to monitor the voice footprint of each individual of the group of individuals in the second time period that precedes the first time period. The voice footprint of each individual of the group of individuals may be monitored based on activities of each individual of the group of individuals in the second time period in the defined area.

In accordance with an embodiment, the circuitry may be further configured to train the personalized voice assistance system to recognize a voice of each of the group of individuals. The personalized voice assistance system may be trained based on at least the monitored voice footprint of each of the group of individuals. The circuitry may be further configured to train the personalized voice assistance system based on a custom machine learning system configured for emotion-based voice generation to assist the first individual.

In accordance with an embodiment, the circuitry may be further configured to generate a predictive content for the detected activity of the first individual based on the activities of each of the group of individuals. The circuitry may be further configured to identify at least one of the group of individuals who is related to the detected activity of the first individual. The at least one of the group of individuals may be identified based on the activities of remaining individuals (other than the first individual) of the group of individuals. The circuitry may be further configured to generate an activity report that includes an influence of the detected activity associated with the first individual on at least one of the remaining individuals of the group of individuals. The generated activity report may further include an emotion reaction corresponding to the detected activity.

FIG. 1 is a block diagram that illustrates an exemplary network environment to provide a personalized emotion-based voice assistance to an individual, in accordance with an embodiment of the disclosure. With reference to FIG. 1, there is shown an exemplary network environment 100. The exemplary network environment 100 may include a personalized voice assistance system 102. The exemplary network environment 100 may further include a plurality of sensors 104, such as an image-capture device 104A, an audio input device 104B, a plurality of internet-of-things (IOT) enabled devices 104C, and other type of sensors (such as wearable devices or biometric sensors (not shown), an audio output device 106, a storage server 108, a communication network 110. In some embodiments, the image-capture device 104A, the audio input device 104B, and the audio output device 106 may be communicatively coupled with the personalized voice assistance system 102, via the communication network 110. In some embodiments, the image-capture device 104A, the audio input device 104B, and the audio output device 106 may be integrated in the personalized voice assistance system 102. With reference to FIG. 1, there is further shown a group of individuals 112 in a defined area 114. In some embodiments, the plurality of IOT enabled devices 104C and other sensors may be located inside the defined area 114.

The personalized voice assistance system 102 may comprise suitable logic, circuitry, interfaces, and/or code that may be configured to generate emotion-based voice to assist an individual, such as a first individual 112a, from the group of individuals 112 in the defined area 114. The emotion-based voice may be generated based on an activity of the individual in the defined area 114 in absence of one or more remaining individuals, such as the individuals 112b, 112c, and 112d, of the group of individuals 112 in the defined area 114. The personalized voice assistance system 102 may detect the activity of the individual based on at least one image of the individual captured by the image-capture device 104A in the defined area 114. The emotion-based voice may be generated based on an emotional reaction of the one or more remaining individuals. In certain scenarios, if an activity of the individual in the defined area 114 is detected as abnormal, this may also trigger the personalized voice assistance system 102 to generate emotion-based voice to assist the individual. Further, the personalized voice assistance system 102 may be configured to imitate (mimic or reproduce) a voice of one of the one or more remaining individuals to generate emotion-based voice through the audio output device 106 to assist the individual. In an exemplary scenario, the personalized voice assistance system 102 may be implemented using at least one of, but not limited to, a home assistant system, an intelligent personal assistant, a server, a digital camera, a personal computer, a laptop computer, a computer workstation, a mainframe computer, a handheld computer, a cellular/mobile telephone, a smart appliance, a digital camcorder, a camera phone, a video player, a television, or an amplifier.

The plurality of sensors 104 may comprise suitable logic, circuitry, interfaces, and/or code that may be configured to acquire one or more data items and communicate the acquired one or more data items to the personalized voice assistance system 102. The plurality of sensors 104 may comprise the image-capture device 104A, the audio-capture device 104B, the plurality of IOT enabled devices 104C, and the other type of sensors (such as motion sensors, wearable devices, health monitors and the like). Examples of the acquired one or more data items may include, but are not limited to at least one image and/or at least one audio stream associated with the one or more (e.g. the first individual 112a) of the group of individuals 112.

In accordance with an embodiment, the image-capture device 104A may comprise suitable logic, circuitry, interfaces, and/or code that may be configured to capture images from the defined area 114. The image-capture device 104A may be configured to capture a plurality of images or video of the group of individuals 112 present in the defined area 114 for a certain time period. In an exemplary scenario, the image-capture device 104A may be implemented using at least one of, but not limited to, a digital camera, an image sensor, a digital camcorder, or a camera phone. A person of ordinary skill in the art will understand that the capture of the plurality of images or video of at least one of the group of individuals 112 by the image-capture device 104A in the defined area 114 is not limited to a single image-capture device, such as the image-capture device 104A, as shown.

The plurality of images or video may be captured by multiple image-capture devices, such as the image-capture device 104A, that are installed in the defined area 114. Further, the multiple image-capture devices may be installed in the defined area 114 in a way that provides an effective coverage to capture images of the group of individuals 112 in the defined area 114. For example, the multiple image-capture devices may be installed at different positions (e.g., horizontal, vertical, diagonal, or a combination thereof) of the defined area 114 so as to capture at least facial expressions, gestures, or body language of at least one or more of the group of individuals 112 in the defined area 114.

In accordance with an embodiment, the audio input device 104B may comprise suitable logic, circuitry, interfaces, and/or code that may be configured to record the voice of the group of the individuals 112 based on the activities of the group of individuals in the defined area 114. The audio input device 104B may record the voice in synchronization with the captured plurality of images or video by the image-capture device 104A. Examples of the audio input device 104B may include, but are not limited to, an amplifier, a headphone, a microphone. A person ordinary skilled in the art will understand that the recorded voice of the at least one of the group of individuals 112 by the audio input device 104B in the defined area 114 is not limited to a single input audio device, such as the audio input device 104B, as shown. The voice of the at least one of the group of individuals 112 may be recorded by multiple input audio devices, such as the audio input device 104B, that are installed in the defined area 114. Further, the multiple input audio devices may be installed in the defined area 114 in a way that provides an effective record of the voice of different individuals of the group of individuals 112 in the defined area 114. For example, the multiple input audio devices may be installed at different positions (e.g., horizontal, vertical, diagonal, or a combination thereof) in the defined area 114 to record the voice that is clear and audible with minimum noise.

The plurality of IOT enabled devices 104C may comprise suitable logic, circuitry, interfaces, and/or code that may be configured to sense one or more parameters to detect activity of different individuals of the group of individuals 112 in the defined area 114. The plurality of IOT enabled devices 104C may be configured to communicate with the personalized voice assistance system 102 via the communication network 110. Examples of the plurality of IOT enabled devices 104C may include, but is not limited to IOT enabled home appliances such as an IOT enabled microwave oven, an IOT enabled refrigerator, an IOT enabled smart television, an IOT enabled burglar alarm system, an IOT enabled printer, an IOT enabled scanner and an IOT enabled electric kettle.

The audio output device 106 may comprise suitable logic, circuitry, interfaces, and/or code that may be configured to output a voice similar to the voice of a second individual 112b to assist the first individual 112a. For example, the second individual 112b may be a family member who may be absent in the defined area 114. The personalized voice assistance system 102 may be configured to determine a requirement of an assistance for the first individual 112a based on the detected activity in the defined area 114. Thus, the personalized voice assistance system 102 may be configured to generate a personalized emotion-based voice similar to the second individual 112b. Alternatively stated, the voice with an emotional pitch of the second individual 112b may be imitated (or mimicked). The audio output device 106 may receive the generated emotion-based voice from the personalized voice assistance system 102, via the communication network 110. The received emotion-based voice may be output in the defined area 114 to provide personalized assistance to the first individual 112a. Examples of the audio output device 106 may include, but are not limited to, an amplifier, a speaker, and/or a loud speaker. In some embodiments, the audio output device 106 may be a part of the personalized voice assistance system 102.

The communication network 110 may include a communication medium through which the personalized voice assistance system 102 may communicate with the image-capture device 104A, the audio input device 104B, the audio output device 106, and the storage server 108. The communication network 110 may be a wired or wireless communication channel or network. Examples of the communication network 110 may include, but are not limited to, a Wireless Fidelity (Wi-Fi) network, a Local Area Network (LAN), a wireless personal area network (WPAN), a Wireless Local Area Network (WLAN), a wireless wide area network (WWAN), a cloud network, a Long Term Evolution (LTE) network, a plain old telephone service (POTS), a Metropolitan Area Network (MAN), and/or the Internet. Various devices in the exemplary network environment 100 may be configured to connect to the communication network 110, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, Long Term Evolution (LTE), Light Fidelity (Li-Fi), and/or other cellular communication protocols or Bluetooth (BT) communication protocols, including variants thereof.

The group of individuals 112 may correspond to one or more living entities of the defined area 114, for example, an enclosed area or a semi-enclosed area of a home. The group of individuals 112 may know each other or may be associated with each other based on a relationship among the group of individuals. For example, the group of individuals 112 may correspond to one of: a group of family members, relatives, roommates, acquaintances, a group of friends, house dwellers, or a combination thereof. The group of individuals 112 may also correspond to a group of students and teachers or a group of employees, employers, and the like.

In operation, the personalized voice assistance system 102 may be configured to receive image data and/or videos from the image-capture device 104A, via the communication network 110. The image-capture device 104A may be configured to capture the at least one image of the first individual 112a of the group of individuals 112 in the defined area 114. The personalized voice assistance system 102 may be configured to process the at least one captured image of the first individual 112a to detect an activity of the first individual 112a in a first time period in the defined area 114. The activity of the first individual 112a may be detected in real time or near-real time based on the at least one captured image in an absence of one or more remaining individuals of the group of individuals 112 in the first time period in the defined area 114. The detection of the activity of the first individual 112a in the first time period in the defined area 114 based on the at least one captured image has been described in detail, for example, in FIG. 2.

In accordance with an embodiment, the audio-capture device 104B may be configured to capture an audio stream from the defined area 114. The captured audio stream may comprise voices of one or more of the group of individuals 112 and one or more ambient sounds in the defined area 114. The audio-capture device 104B may be configured to communicate the captured audio stream to the personalized voice assistant system 102. The personalized voice assistance system 102 may be configured to analyze the captured audio to identify the one or more ambient sounds in the captured audio stream.

The personalized voice assistance system 102 may be further configured to detect the activity of the first individual 112a in a first time period in the defined area 114, based on the identified one or more ambient sounds. For example, the personalized voice assistance system 102 may analyze the captured audio to identify the one or more ambient sounds to be indicative of guitar string strokes. In such cases, the personalized voice assistance system 102 may detect the first individual 112a to be engaged in the activity such as playing a guitar. In certain scenarios, the image-capture device 104a and the audio-capture device 104b may be unavailable to the personalized voice assistance system 102. In such scenarios, one or more of the plurality of sensors 104 other than the image-capture device 104a and the audio-capture device 104b may be configured to acquire one or more data items associated with the first individual 112a. Examples of the acquired one or more data items may comprise data items which correspond to a heart rate, and a body posture. The personalized voice assistance system 102 may be configured to analyze the acquired one or more data items to detect the activity of the first individual 112a in a first time period in the defined area 114.

In other embodiments, the plurality of IOT enabled devices 104C of the defined area 114 may be configured to sense one or more parameters associated with one or more of the plurality of IOT enabled devices 104C. The plurality of IOT enabled devices 104C may be configured to communicate the sensed one or more parameters to the personalized voice assistance system 102. The personalized voice assistance system 102 may be configured to analyze the sensed one or more parameters to detect an activity of the first individual 112a in a first time period in the defined area 114. For example, the first individual 112a may use an IOT enabled microwave oven of the plurality of IOT enabled devices 104C during the first time period, to heat a food item (such as a loaf of bread, and cake batter). The IOT enabled microwave oven may sense the one or more parameters such as an operational mode (e.g. a convection mode, a microwave mode, and a grill mode) of the IOT enabled microwave oven, set by the first individual 112a prior to use of the IOT enabled microwave oven. The IOT enabled microwave oven may be further configured to measure a time duration for which the first individual 112a uses the IOT enabled microwave oven to heat the food item. The IOT enabled microwave oven may be configured to communicate the sensed one or more parameters (such as the sensed operational mode and the measured time duration) to the personalized voice assistance system 102.

The personalized voice assistance system 102 may be configured to analyze the sensed one or more parameters to determine the activity of the first individual 112a in the first time period in the defined area 114. In cases where the IOT enabled microwave oven senses the operational mode to be the microwave mode and the measured time duration to be thirty seconds, the personalized voice assistance system 102 may determine that the first individual 112a is reheating the food item such as a loaf of bread. In cases where the IOT enabled microwave oven senses the operational mode to be the convection mode and the measured time duration to be fifteen minutes, the personalized voice assistance system 102 may determine that the first individual 112a may be baking a cake. Therefore, the personalized voice assistance system 102 may detect the first individual 112a to be engaged in the activity, (such as baking a cake or reheating one or more loaves of bread).

The personalized voice assistance system 102 may be configured to analyze the detected activity of the first individual 112a. The detected activity of the first individual 112a may be analyzed to determine whether the detected activity is in accordance with at least one of usual activities of the first individual 112a or a schedule plan of activities associated with the first individual 112a. Based on the analyzed activity, the personalized voice assistance system 102 may be configured to determine an emotional state of the first individual 112a in the first time period in the defined area 114. The emotional state of the first individual 112a may correspond to at least one of a facial expression, such as angry, happy, sad, excited, neutral, bored, and/or the like. In some embodiments, the emotional state of the first individual 112a may also correspond to a sentiment, a mood, a response, or a feeling while the activity is performed by the first individual 112a in the first time period in the defined area 114. The determination of the emotional state of the first individual 112a has been described in detail, for example, in FIG. 2.

Based on the determined emotional state of the first individual 112a, the personalized voice assistance system 102 may be configured to determine a requirement of an assistance for the first individual 112a in the defined area 114. For example, the personalized voice assistance system 102 may determine that the first individual 112a requires the assistance when the determined emotional state of the first individual 112a corresponds to a negative emotional state.

The personalized voice assistance system 102 may be configured to identify a second individual (such as the second individual 112b) from the group of individuals 112 based on the determined requirement of the assistance for the first individual 112a. For example, when the personalized voice assistance system 102 determines that the first individual 112a may require the assistance, the second individual (different from the first individual 112a) may be identified from the group of individuals 112. The second individual may be identified from the group of individuals 112 based on a dynamic association of the detected activity of the first individual 112a with the second individual (such as the second individual 112b). Such dynamic association of the first individual 112a with the second individual may be determined based on a historical conversation associated with the detected activity of the first individual 112a. For example, the dynamic association of the first individual 112a with the second individual may be determined based on the historical conversation (between the first individual 112a and the second individual) corresponding to a previous activity that is similar to the detected activity of the first individual 112a in the first time period in the defined area 114.

The personalized voice assistance system 102 may be configured to compute an emotional reaction of the second individual (such as the second individual 112b). The emotional reaction of the second individual may be computed based on the detected activity of the first individual 112a for the determined requirement of the assistance for the first individual 112a. The computation of the emotional reaction of the second individual has been described in detail, for example, in FIG. 2.

The personalized voice assistance system 102 may be further configured to generate an output voice similar to a voice of the second individual (such as the second individual 112b) based on at least the computed emotional reaction (i.e., a likely emotional reaction of the second individual for the detected activity of the first individual 112a). The output voice may be generated based on a voice footprint of the second individual (such as the second individual 112b). The voice footprint of the second individual may correspond to a second time period that precedes the first time period. The personalized voice assistance system 102 may retrieve the voice footprint of the second individual from the storage server 108, via the communication network 110. The retrieved voice footprint of the second individual may have been recorded previously by a recording device (not shown) associated with the image-capture device 104A or the audio input device 104B based on an activity that is similar to the detected activity in the second time period. At the time of training (i.e., during a machine learning and training phase) of the personalized voice assistance system 102, such voice footprint of each individual of the group of individuals 112 may be monitored and recorded for future use.

The personalized voice assistance system 102 may be configured to monitor the voice footprint of each individual of the group of individuals 112 in the second time period. The voice footprint of each individual of the group of individuals 112 may be monitored based on the activities of each individual of the group of individuals 112 in the second time period in the defined area 114. Based on the monitored voice footprint of each individual of the group of individuals 112, the personalized voice assistance system 102 is trained to recognize a voice of each individual of the group of individuals 112. The personalized voice assistance system 102 may be trained based on a custom machine learning system configured for emotion-based voice generation to assist the first individual 112a. The training of the personalized voice assistance system 102 has been described in detail, for example, in FIG. 2 and FIG. 4.

In accordance with an embodiment, the trained personalized voice assistance system 102 may be configured to generate the output voice based on at least one of the computed emotion reaction or the voice footprint of the second individual (such as the second individual 112b). The generation of the output voice by the personalized voice assistance system 102 has been described in detail, for example, in FIG. 2 and FIG. 5. The personalized voice assistance system 102 may be further configured to generate a predictive content for the detected activity of the first individual 112a based on the activities of each individual of the group of individuals 112. For example, the predictive content may correspond to voice assistance content related to the detected activity in a smart home (such as the defined area 114). Further, the personalized voice assistance system 102 may be configured to identify at least one of the group of individuals 112 who is related to the detected activity of the first individual 112a. The at least one of the group of individuals 112 may be identified based on the activities of the one or more remaining individuals of the group of individuals 112. The personalized voice assistance system 102 may be further configured to generate an activity report. The activity report may include an influence of the detected activity associated with the first individual 112a on the at least one of the remaining individuals. The generated activity report may further include the emotion reaction corresponding to the detected real time or near-real time activity.

Figure 2:
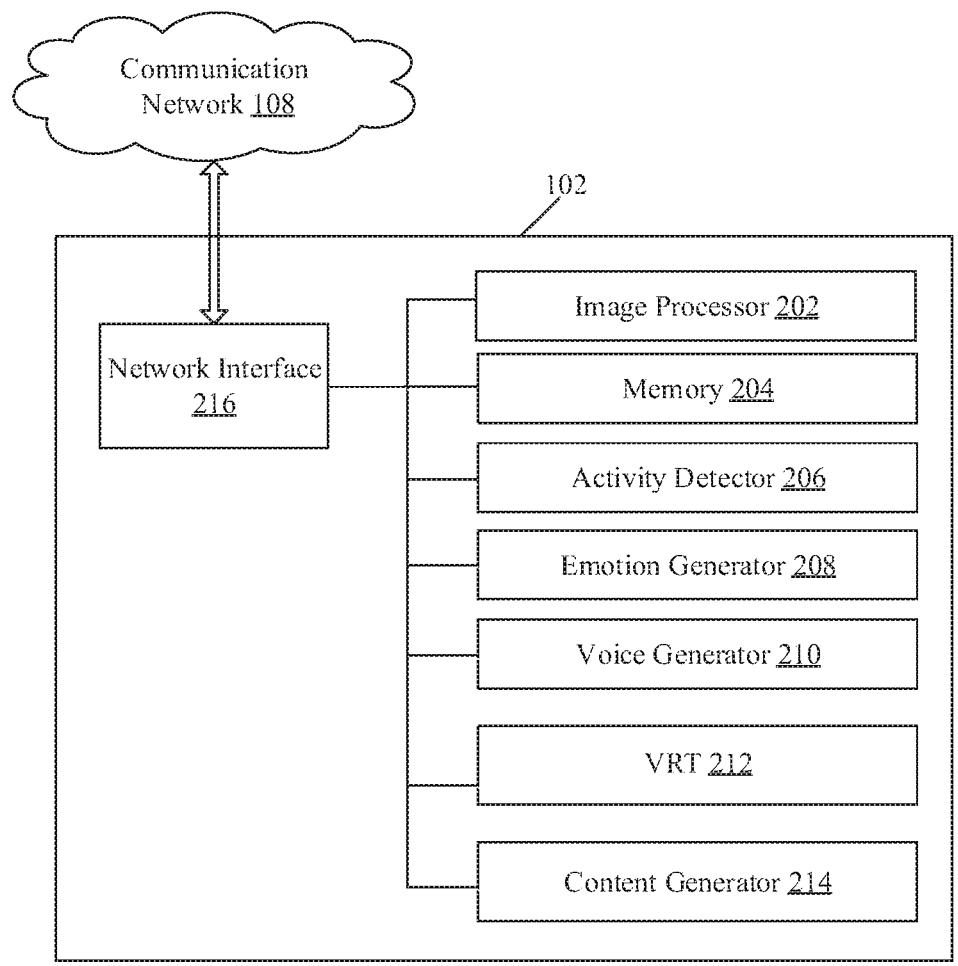
FIG. 2 is a block diagram that illustrates an exemplary personalized voice assistance system, in accordance with an embodiment of the disclosure.

FIG. 2 is a block diagram that illustrates an exemplary personalized voice assistance system, in accordance with an embodiment of the disclosure. FIG. 2 is described in conjunction with elements from FIG. 1. With reference to FIG. 2, there is shown a block diagram of an exemplary personalized voice assistance system, such as the personalized voice assistance system 102. The personalized voice assistance system 102 may include circuitry, such as an image processor 202, a memory 204, an activity detector 206, an emotion generator 208, a voice generator 210, a voice recognizer and trainer (VRT) 212, and a content generator 214. The personalized voice assistance system 102 may further include a network interface 216. With reference to FIG. 2, there is further shown the communication network 110 (FIG. 1).

In accordance with an embodiment, the image processor 202 may be communicatively coupled to the memory 204, the activity detector 206, the emotion generator 208, the voice generator 210, the VRT 212, the content generator 214, and the network interface 216. The network interface 216 may be configured to communicate with the image-capture device 104A, the audio input device 104B, and the audio output device 106, via the communication network 110, under the control of the image processor 202 and the VRT 212.

The image processor 202 may comprise suitable logic, circuitry, interfaces, and/or code that may be configured to execute a set of instructions stored in the memory 204. The image processor 202 may be configured to receive digital image data and/or videos, such as an input image, from the image-capture device 104A. The image processor 202 may be further configured to analyze the input image to determine a presence or an absence of the first individual 112a or other individuals from the group of individuals 112 in the input image. Based on the analysis of the input image, the image processor 202 may instruct the activity detector 206, the emotion generator 208, the voice generator 210, and the VRT 212, to generate an output voice for personalized assistance of the first individual 112a. The image processor 202 may be implemented based on a number of processor technologies, which are known in the art. Examples of the image processor 202 may be an X86-based processor, a Reduced Instruction Set Computing (RISC) processor, an Application-Specific Integrated Circuit (ASIC) processor, a Complex Instruction Set Computing (CISC) processor, and/or other processors or control circuits.

The memory 204 may comprise suitable logic, circuitry, interfaces, and/or code that may be configured to temporarily store the received input image, such as an image buffer. The memory 204 may be further configured to store a set of instructions executable by at least one of the image processor 202, the activity detector 206, the emotion generator 208, the voice generator 210, or the VRT 212, to generate the output voice for the personalized assistance. The memory 204 may be further configured to store operating systems and associated applications of the personalized voice assistance system 102. The memory 204 may be further configured to store a schedule plan of activities associated with each of the group of individuals 112. The schedule plan of activities of an individual of the group of individuals 112 may comprise information associated with a plurality of activities usually performed by the corresponding individual during the course of a day. The schedule plan of activities associated with each individual of the group of individuals 112 further comprises time constants which correspond to one or more time limits for completion of the one or more activities of the plurality of activities by the corresponding individual. The memory 204 may be further configured to store a baseline behavior pattern associated with each of the group of individuals 112. The baseline behavior pattern of each of the group of individuals 112 is indicative of a manner or pattern in which the respective individual behaves under certain predefined circumstances. Examples of implementation of the memory 204 may include, but are not limited to, Random Access Memory (RAM), Dynamic Random Access Memory (DRAM), Static Random Access Memory (SRAM), Thyristor Random Access Memory (T-RAM), Zero-Capacitor Random Access Memory (Z-RAM), Read Only Memory (ROM), Hard Disk Drive (HDD), a Secure Digital (SD) card, flash drive, cache memory, and/or other non-volatile memory.

The activity detector 206 may comprise suitable logic, circuitry, interfaces, and/or code that may be configured to detect an activity of the first individual 112a based on an analysis of the input image (or video). The activity may be detected in real time or near-real time based on the presence of the first individual 112a in the input image. The activity detector 206 may be further configured to analyze the detected activity to determine whether the detected activity is in accordance with defined rules of activities, for example, usual activities of the first individual 112a or a schedule plan of activities of the first individual 112a. The activity detector 206 may be further configured to determine a requirement of an assistance for the first individual 112a in the defined area 114 based on the analyzed activity. The activity detector 206 may be implemented as, for example, an ASIC or a field-programmable gate array (FPGA).

The emotion generator 208 may comprise suitable logic, circuitry, interfaces, and/or code that may be configured to determine an emotional state of the first individual 112a in the input image based on the analyzed activity. The emotion generator 208 may be further configured to compute an emotion reaction of a second individual (different from the first individual 112a) from the group of individuals 112 image based on the detected activity of the first individual 112a in an absence of the second individual (such as the second individual 112b) in the input image. The emotion generator 208 may be implemented on an ASIC or FPGA. In an implementation, the emotion generator 208 may be implemented, for example, on the same ASIC or FPGA as the activity detector 206.

The voice generator 210 may comprise suitable logic, circuitry, interfaces, and/or code that may be configured to generate an output voice similar to a voice of the second individual (such as the second individual 112b). The voice generator 210 may generate the output voice based on at least the computed emotional reaction of the second individual. The voice generator 210 may be implemented using at least one of an audio digital signal processing (DSP) chip or a voice frequency analyzer on an ASIC or FPGA. In an implementation, the voice generator 210 may be implemented on the same ASIC as the emotion generator 208.

The VRT 212 may comprise suitable logic, circuitry, interfaces, and/or code that may be configured to recognize a voice of each individual of the group of individuals 112. The personalized voice assistance system 102 may be trained to recognize the voice of each individual of the group of individuals 112. The personalized voice assistance system 102 may be further trained to determine the emotional state of each individual of the group of individuals 112. The VRT 212 may train the personalized voice assistance system 102 based on the voice footprint of each individual of the group of individuals 112. The VRT 212 may be implemented as a custom machine learning system, configured for emotion-based voice recognition and generation, on an ASIC or FPGA.

The content generator 214 may comprise suitable logic, circuitry, interfaces, and/or code that may be configured to generate content related to the detected activity of the first individual 112a. The content generator 214 may further generate an activity report that includes an influence of the detected activity associated with the first individual 112a on at least one of remaining individuals of the group of individuals 112. The content generator 214 may be implemented, for example, on an ASIC or FPGA.

The network interface 216 may comprise suitable logic, circuitry, interfaces, and/or code that may be configured to communicate with at least one of the image-capture device 104A, the audio input device 104B, or the audio output device 106 (as shown in FIG. 1), via the communication network 110 (as shown in FIG. 1). The network interface 216 may be implemented by application of known technologies to support wired or wireless communication of the personalized voice assistance system 102 with the communication network 110. Components of the network interface 216 may include, but are not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

In operation, the image processor 202 may be configured to receive digital image data and/or videos from the image-capture device 104A, via the communication network 110. The image-capture device 104A may capture the digital image data and/or videos of the defined area 114 in a first time period. The defined area 114 may correspond to one of an enclosed area or a semi-enclosed area in which the image-capture device 104A may be installed to capture the defined area 114 with or without a presence of at least one of the group of individuals 112. Based on the captured image data and/or videos of the defined area 114 in the first time period, the image-capture device 104A may transmit the captured image data and/or videos to the image processor 202, via the communication network 110. Alternatively, the image-capture device 104A may store the captured image data and/or videos in the storage server 108. In such a case, the image processor 202 may retrieve the captured image data and/or videos from the storage server 108.

For the sake of brevity, the ongoing description has been described with reference to a single image, for example, at least one image of the defined area 114 captured by the image-capture device 104A in the first time period. However, the scope of the disclosure is not limited to the single image. Similar to the processes executed on the at least one captured image, other captured images of the first time period or subsequent time periods may be processed to generate an emotion-based voice, if required, for the defined area 114.

The image processor 202 may be configured to analyze the at least one captured image to determine an absence or a presence of the group of individuals 112 in the at least one captured image of the defined area 114. For example, based on the absence or the presence of the group of individuals 112 in the at least one captured image, the image processor 202 may proceed to the analysis of a next captured image associated with a subsequent time period to the first time period. The image processor 202 may be further configured to analyze the at least one captured image to determine the presence of the first individual 112a of the group of individuals 112 in the at least one captured image of the defined area 114. For example, the image processor 202 may determine the presence of the first individual 112a in the at least one captured image. The image processor 202 may also determine that one or more individuals, such as the second individual, are absent in the defined area 114. For example, some family members may not be present in a home for a certain time. Further, based on the determined presence of the first individual 112a in the at least one captured image and the determined absence of the one or more individuals of the group of individuals 112, the image processor 202 may instruct the activity detector 206 to detect an activity of the first individual 112a based on the at least one captured image.

In accordance with an embodiment, the activity detector 206 may be configured to detect the activity of the first individual 112a in the first time period in the defined area 114 based on the at least one captured image. The activity of the first individual 112a may be detected in real time or near-real time. The activity of the first individual 112a may correspond to at least one of usual activities of the first individual 112a or a schedule plan of activities associated with the first individual 112a. For example, an activity may correspond to an action in which the first individual 112a is having a food item. In another example, an activity may correspond to an action in which the first individual 112a is involved in a game play. In yet another example, an activity may correspond to an action in which the first individual 112a is inside a worship hall. In yet another example, an activity may correspond to an action in which the first individual 112a is watching a program on a television or a computing device. A person of ordinary skill in the art would understand that examples of the activity of the first individual 112a, as described above, are for exemplary and illustrative purposes only, and therefore, shall not be construed to limit the scope of the disclosure. Further, based on the analysis of such actions of the first individual 112a in the defined area 114 captured by the image-capture device 104A, the activity detector 206 may detect the activity of the first individual 112a in the first time period in the defined area 114.

The activity detector 206 may be further configured to analyze the detected activity of the first individual 112a to determine whether the detected activity is in accordance with at least one of the usual activities or the schedule plan of activities. In an implementation where the activity detector 206 determines that the detected activity is in accordance with at least one of the usual activities or the schedule plan of activities, the activity detector 206 may instruct the emotion generator 208 to determine an emotional state of the first individual 112a.

The emotion generator 208 may be configured to determine the emotional state of the first individual 112a based on at least the analyzed activity. For example, the emotional state of the first individual 112a may correspond to a positive emotional state (e.g., happy or excited) or a negative emotional state (e.g., sad or angry). The emotional state of the first individual 112a may be determined based on at least one of a facial expression, a body language, or a gesture of the first individual 112a in the at least one captured image. Based on the determined facial expression, body language, or gesture of the first individual 112a, the emotion generator 208 may determine the emotional state of the first individual 112a. Based on the determined emotional state of the first individual 112a, the activity detector 206 may determine that an assistance is required for the first individual 112a in the defined area 114.

Alternatively, in cases where one or more individuals of the group of individuals 112 are determined to be absent in the defined area 114, the emotion generator 208 may determine the emotional state of the first individual 112a. The activity detector 206 may be configured to analyze the determined emotional state of the first individual 112a. The activity detector 206 may automatically check whether the first individual 112a needs assistance by analysis of the determined emotional state. In such cases, the content generator 214 may generate a predictive content (such as a message for the first individual 112a) for the detected activity of the first individual 112a.

The voice generator 210 may generate an output voice to provide personalized assistance to the first individual 112a in the defined area 114, based on the generated predictive content. For example, in cases where the determined emotional state of the first individual 112a is negative (such as a sad emotional state or an angry emotional state), the activity detector 206 determines the requirement for the assistance for the first individual 112a. In such cases, the content generator 214 may be configured to generate the predictive content for the detected activity of the first individual 112a in the defined area 114. The voice generator 210 may be configured to generate an output voice to provide a personalized assistance to the first individual 112a in the defined area 114, based on the generated predictive content. Hence, the requirement for the assistance may be determined based on the absence of the one or more remaining individuals of the group of individuals 112 in the first time period in the defined area 114. The output voice may be generated based on the absence of the one or more remaining individuals of the group of individuals in the first time period in the defined area 114. Alternatively stated, in the absence of one of the group of individuals 112 in defined area 114, the personalized voice assistance system 102 may automatically understand a need of assistance for the first individual 112a who may be monitored for activity recognition for the first time stamp. The personalized voice assistance system 102 may further perform content generation and voice assistance based on the absence of one of the group of individuals 112.

In other embodiments, the schedule plan of activities (stored in the memory 204) may comprise one or more time constants which correspond to one or more time limits for completion (wholly or up to a certain limit) of one or more activities (such as the detected activity) by the first individual 112a. The activity detector 206 may be configured to measure a first time duration taken by the first individual 112a to complete the detected activity (wholly or up to a certain limit). The activity detector 206 may be configured to compare the measured first time duration with a first time limit associated with the detected activity. The activity detector 206 may be configured to determine a time deviation parameter with the detected activity based on a difference between the first time limit and the first time duration. In cases where the measured first time duration exceeds the first time limit, the emotion generator 208 may determine the emotional state of the first individual 112a based on the determined time deviation parameter.

In other embodiments, the memory 204 may store a first baseline behavior pattern associated with the first individual 112a. The emotion generator 208 may be configured to determine a first behavior pattern exhibited by the first individual 112a while the first individual 112a performs the detected activity. In one example, the activity detector 206 may be configured to determine a first behavior pattern associated with the first individual 112a based on the determined emotional state. The activity detector 206 may be further configured to compare the first behavior pattern and the first baseline behavior pattern to determine a behavior deviation parameter (of the first individual 112a while the first individual 112a is engaged in the detected activity) based on a difference between the first behavior pattern and the first baseline behavior pattern. In certain scenarios, the emotion generator 208 may be configured to determine the emotional state based on the determined time deviation parameter and the determined behavior deviation parameter of the first individual 112a. In accordance with an embodiment, the activity detector 206 may determine that an assistance is required for the first individual 112a in the defined area 114 based on the emotional state, the time deviation parameter and the behavior deviation parameter.

In another implementation where the activity detector 206 determines that the detected activity is not in accordance with at least one of the usual activities or the schedule plan of activities, the activity detector 206 may also instruct the emotion generator 208 to determine the emotional state of the first individual 112a, as described above. The activity detector 206 determines that the assistance is required for the first individual 112a in the defined area 114 based on an unusual/abnormal activity.

Based on the determined requirement of the assistance for the first individual 112a, the activity detector 206 may further instruct the emotion generator 208 to compute an emotional reaction of a second individual (different from the first individual 112a) from the group of individuals 112. The second individual may be identified from the group of individuals 112 based on a dynamic association of the detected activity of the first individual 112a with the second individual. For example, in a second time period that precedes the first time period and for a previous activity that is similar (or same) to the detected activity of the first individual 112a, one of the group of individuals 112 (such as the second individual 112b) may have had conversation with the first individual 112a in the second time period. The emotion generator 208 may retrieve a voice footprint or image data corresponding to such historical conversation from the storage server 108 or the memory 204. Based on analysis of the at least one of the voice footprint or image data associated with such historical conversation, one of the group of individuals 112 who had conversation with the first individual 112a in the past may be identified as the second individual, such as the second individual 112b.

In accordance with an embodiment, the emotion generator 208 may be configured to compute the emotion reaction of the second individual identified from the group of individuals 112. The emotion generator 208 may compute the emotion reaction of the second individual based on the detected activity of the first individual 112a. For example, the emotion reaction of the second individual may be computed based on the analysis of the at least one of the voice footprint or image data associated with the second time period (e.g., a time period that is previous to a time instant/period of the detected activity). The emotion reaction of the second individual may correspond to one of a positive emotional reaction (e.g., happy) or a negative emotional reaction (e.g., angry). Based on the computed emotional reaction of the second individual, the emotion generator 208 may instruct the voice generator 210 to generate an output voice to provide a personalized assistance to the first individual 112a in the defined area 114.

In accordance with an embodiment, the voice generator 210 may be configured to generate the output voice similar to a voice of the second individual (such as the second individual 112b) based on the computed emotional reaction of the second individual. The output voice may be further generated based on the voice footprint of the second individual in the second time period. For example, the voice generator 210 may be configured to dynamically identify a voice pattern from the voice footprint of the second individual. Further, the voice generator 210 may be configured to dynamically compute a voice pitch based on the voice footprint of the second individual. The voice generator 210 may further execute voice synthesis of the voice pattern and the voice pitch along with the computed emotion reaction of the second individual to generate the output voice that is similar to the voice of the second individual. The voice generator 210 may further transmit the generated output voice to the audio output device 106, via the communication network 110.

In accordance with an embodiment, the personalized voice assistance system 102, as described above, is trained before the generation of the output voice. The VRT 212 may monitor the voice footprint of each individual of the group of individuals 112 in the second time period that precedes the first time period. The voice footprint of each individual of the group of individuals 112 may be monitored based on the activities of each individual of the group of individuals 112 in the second time period in the defined area 114. For example, the voice footprint of each individual of the group of individuals 112 may be monitored based on the historical conversation (as recorded by the audio input device 104B) associated with the activities of each individual of the group of individuals 112 in the second time period in the defined area 114. The VRT 212 may further train the personalized voice assistance system 102 to recognize the voice of each individual of the group of individuals 112, based on at least the monitored voice footprint of each individual of the group of individuals 112. For example, the voice pattern and the pitch (a certain frequency) in the voice footprint of each individual of the group of individuals 112 may be analyzed to train the personalized voice assistance system 102. Similarly, the emotional state (for example, an emotional tone or pitch) in the voice footprint of each individual of the group of individuals 112 may be analyzed to train the personalized voice assistance system 102. The VRT 212 may refer to a custom machine learning system that trains the personalized voice assistance system 102 for emotion-based voice generation to assist the first individual 112a. In some embodiments, the process to train the personalized voice assistance system 102 may be continuously or periodically executed to improve the performance of the personalized voice assistance system 102.

In accordance with an embodiment, the content generator 214 may be configured to generate a predictive content for the detected activity of the first individual 112a in the defined area 114. The predictive content may be generated based on the activities of at least one of the group of individuals 112. For example, the predictive content may be generated based on the emotion reaction analysis of the at least one of the group of individuals 112. Further, the at least one of the group of individuals 112 who is related to the detected activity of the first individual 112a may be identified, based on the activities of remaining individuals, such as the individuals 112b to 112d, of the group of individuals 112.

The content generator 214 may be further configured to generate an activity report that includes an influence of the detected activity of the first individual 112a on at least one of the remaining individuals of the group of individuals 112. For example, consider an instance where the first individual 112a (e.g., a wife) is dressing up for a house party, and while dressing up, may be standing alone in front of a mirror as the second individual (e.g., her husband) is not around her. In such instance, the wife may feel "sad", because her husband is not around to compliment her. The personalized voice assistance system 102 may detect the emotional state of the first individual 112a and an absence of the second individual in the defined area 114, such as a dressing room. An emotion-based voice similar to the second individual (e.g. voice of husband) may be output by the audio output device 106, for example, "Dear you are looking perfect. See you soon at the party." The wife may feel "happy" as if the husband is around. Such "happy" state of the wife will make the husband feel "happy". Such influences may be included in the activity report. The generated activity report may further include the emotion reaction corresponding to the detected activity, as described above. The generated activity report may further include the usual daily activities with corresponding time sequence in which the usual daily activities are performed by the group of individuals 112 in the defined area 114. The generated activity report may further include the most influenced individual from the group of individuals 112 associated with a particular activity, and the corresponding emotion reaction of the at least one of the remaining individuals. For example, for the particular activity of the first individual 112a detected in the defined area 114, the personalized voice assistance system 102 may identify the second individual from the remaining individuals of the group of individuals 112 who may be the most influential individual for the first individual 112a. For example, a father in a family may be the most influential family member for his kids. The most influential individual of the group of individuals 112 may be included in the activity report. The generated activity report may further include the voice output that may influence the first individual 112a to perform the activity in more organized, structured, and disciplined manner.

Figure 3A:
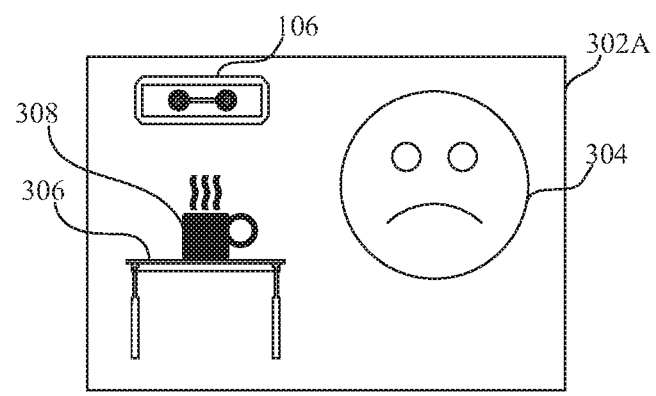
FIGS. 3A and 3B, collectively illustrate an exemplary scenario for implementation of the disclosed personalized voice assistance system and method to provide a personalized emotion-based voice assistance to an individual, in accordance with an embodiment of the disclosure.
Figure 3B:
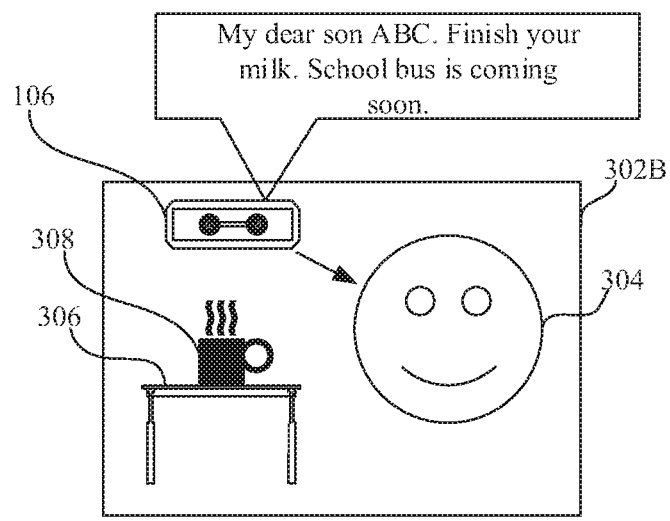

FIGS. 3A and 3B, collectively illustrates an exemplary scenario for implementation of the disclosed personalized voice assistance system and method to provide a personalized emotion-based voice assistance to an individual, in accordance with an embodiment of the disclosure. FIGS. 3A and 3B are described in conjunction with elements from FIGS. 1 and 2.

With reference to FIG. 3A, there is shown an exemplary image, such as an image 302A of a certain sub-area (such as a portion of a dining hall) of the defined area 114 (such as a home) captured by the image-capture device 104A in a first time period. The captured image 302A includes a portion of the first individual 112a, for example, a facial portion 304, as shown. The captured image 302A further includes a dining table 306 on which a cup 308 filled with milk is placed. The captured image 302A further includes a view of the audio output device 106 installed in the defined area 114.

The image processor 202 may be configured to receive the captured image 302A from the image-capture device 104A, via the communication network 110. Based on a presence of the facial portion 304 of the first individual 112a in the captured image 302A of the defined area 114, the activity detector 206 may detect an activity of the first individual 112a based on the captured image 302A. For example, the activity detector 206 may detect the activity where the first individual 112a may have to drink the milk in the cup 308. For example, having a breakfast of a cup of milk at a particular time period during a day may be detected as a schedule plan of activities associated with the first individual 112a. Based on further analysis of the detected activity, the emotion generator 208 determines that the first individual 112a is in a "sad" emotional state. Based on further analysis of the detected activity, an absence of another individual, for example, the mother of the first individual 112a, in the defined area 114 may be detected. In such a case, an assistance to the first individual 112a may be required that may help the first individual 112a to complete the activity. Based on such requirement, the activity detector 206 may instruct the voice generator 210 to generate an output voice for the assistance of the first individual 112a. The voice generator 210 may generate the output voice similar to a second individual (such as the voice of the mother from the group of individuals 112 who is absent in the captured image 302A and in a dining hall in which the first individual 112a is present. The output voice may be generated based on an emotional reaction and a voice footprint of the second individual corresponding to an activity in a second time period (i.e., a previous activity) that precedes the first time period. The generated emotion-based output voice is similar to a voice of the second individual that includes the emotional pitch of the second individual. The reproduction of the generated emotion-based output voice in the defined area 114 for the assistance of the first individual 112a has been shown and described, for example, in FIG. 3B.

With reference to FIG. 3B, there is shown an exemplary image, such as an image 302B captured by the image-capture device 104A. The captured image 302B may correspond to an instance at which the generated emotion-based output voice has been reproduced by the audio output device 106 to provide the personalized assistance to the first individual 112a. For example, the generated emotion-based output voice reproduced in the defined area 114 may be "My dear son ABC<name of first individual 112a>. Finish your milk. School bus is coming soon", as shown. Based on the reproduction of such emotion-based output voice in the defined area 114, the first individual 112a may feel as if the second individual (for example, the mother of the first individual 112a) is around in the room (i.e., the sub-area of the defined area 114, such as a home). Such instance may help to change the emotional state of the first individual 112*a* in the defined area. For example, the emotional state of the first individual 112*a* may be changed to a "happy" emotional state from the "sad" emotional state. Further, the first individual 112*a* may complete the activity on time.

Figure 4:
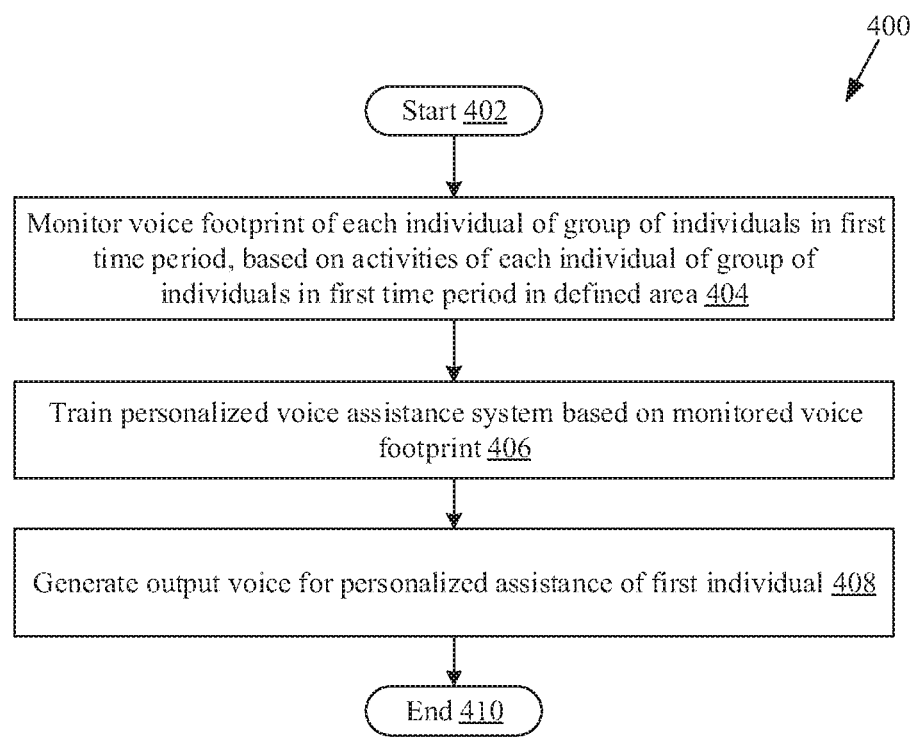
FIG. 4 is a flow chart that illustrates exemplary operations to train the personalized voice assistance system of FIG. 2 to provide a personalized emotion-based voice assistance to an individual, in accordance with an embodiment of the disclosure.

FIG. 4 is a flow chart that illustrates exemplary operations to train the personalized voice assistance system of FIG. 2 to provide a personalized emotion-based voice assistance to an individual, in accordance with an embodiment of the disclosure. With reference to FIG. 4, there is shown a flowchart 400. The flowchart 400 is described in conjunction with, for example, FIGS. 1, 2, and 3. The method starts at 402 and proceeds to 404.

At 404, a voice footprint of each individual of the group of individuals 112 may be monitored in a first time period. The VRT 212 may be configured to monitor the voice footprint of each individual of the group of individuals 112 to recognize a voice pitch and a voice pattern of each individual of the group of individuals 112. The voice footprint may be related to activities of each individual of the group of individuals 112 in the first time period in the defined area 114 (e.g., a smart home). The VRT 212 may retrieve the voice footprint from the storage server 108 or the memory 204. The voice footprint may correspond to a historical conversation (corresponding to the activities by the group of individuals 112) that had been recorded by the audio input device 104B based on the activities of each individual of the group of individuals 112 in the first time period in the defined area 114.

At 406, the personalized voice assistance system 102 may be trained based on the monitored voice footprint. The VRT 212 may be configured to train the personalized voice assistance system 102 to recognize a voice of each individual of the group of individuals 112. The VRT 212 may train the personalized voice assistance system 102 based on the monitored voice footprint of each individual of the group of individuals 112. For example, the VRT 212 may train the personalized voice assistance system 102 based on the voice pitch and the voice pattern of each individual of the group of individuals 112 to recognize the voice of each individual of the group of individuals 112. The VRT 212 that refers to a custom machine learning system configured for emotion-based voice generation to assist the first individual 112*a* in the defined area 114.

At 408, an output voice is generated for personalized assistance of the first individual 112*a*. The trained personalized voice assistance system 102 may be configured to generate the output voice in a voice that is similar to a second individual (different from the first individual 112*a*) from the group of individuals 112. The control passes to the end 410.

Figure 5A:
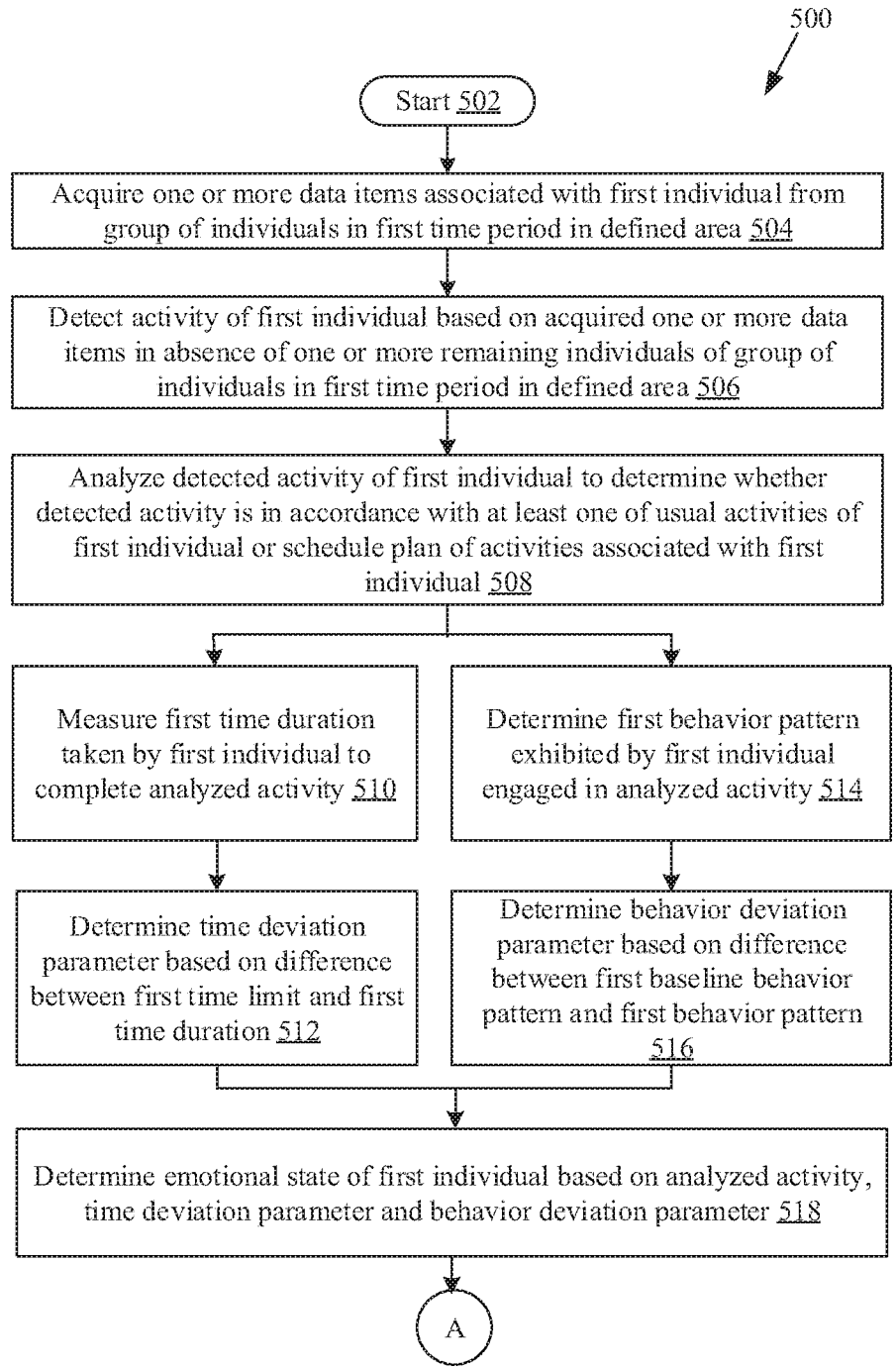
FIGS. 5A and 5B, collectively, depicts a flow chart that illustrates exemplary operations to provide a personalized emotion-based voice assistance to an individual, in accordance with an embodiment of the disclosure.
Figure 5B:
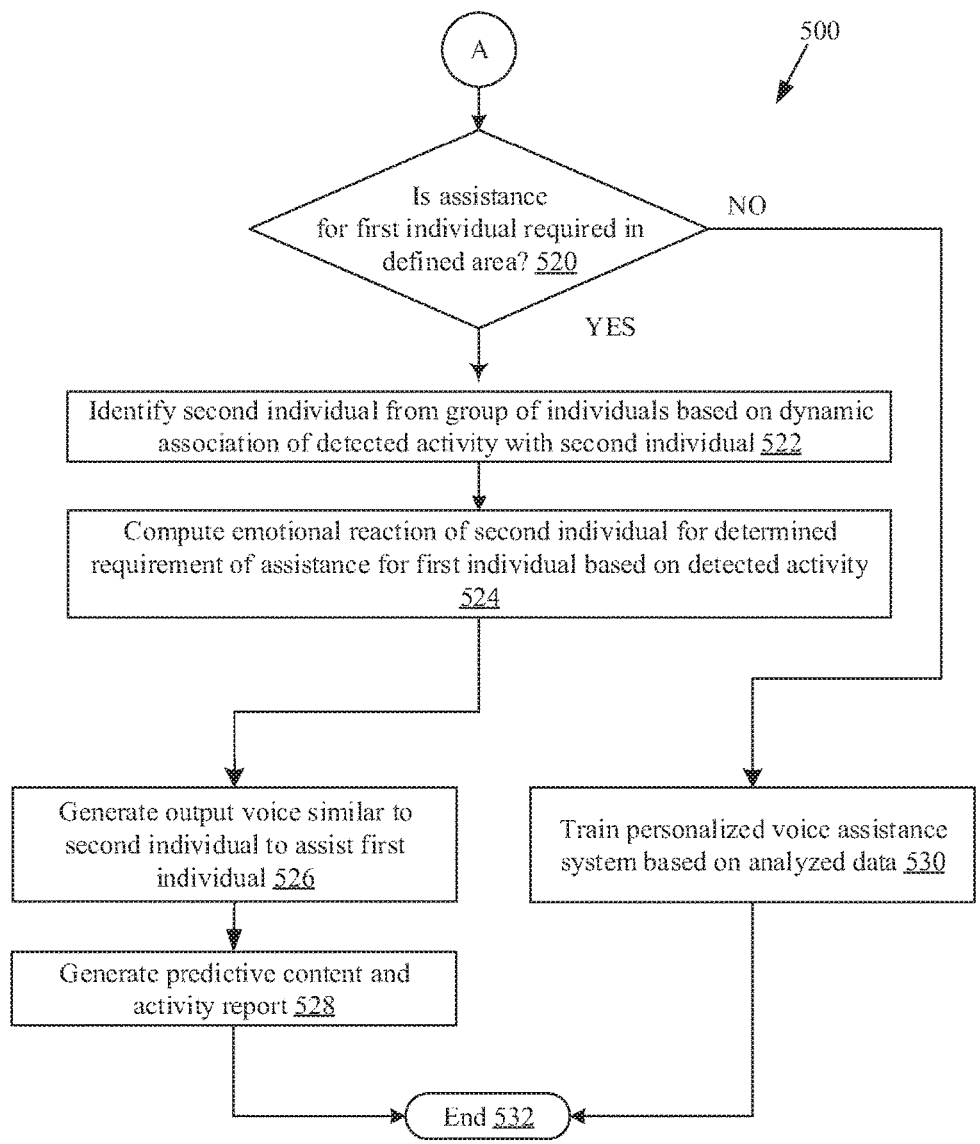

FIGS. 5A and 5B, collectively, depicts a flow chart that illustrates exemplary operations to provide a personalized emotion-based voice assistance to an individual, in accordance with an embodiment of the disclosure. With reference to FIGS. 5A and 5B, there is shown a flow chart 500. The flow chart 500 is described in conjunction with, for example, FIGS. 1, 2, 3A, 3B, and 4. The method starts at 502 and proceeds to 504.

At 504, one or more data items associated with the first individual 112*a* from the group of individuals 112 may be acquired in a first time period in the defined area 114. The plurality of sensors 104 may be configured to acquire the one or more data items (such as at least one captured image or a captured audio) associated with the first individual 112*a* in the first time period in the defined area 114. The defined area 114 may correspond to an enclosed area or a semi-enclosed area in a smart home. The plurality of sensors 104 may be configured to communicate the acquired one or more data items of the first individual 112*a* to the personalized voice assistance system 102, via the communication network 110. An example of the at least one captured image of the first individual 112*a* has been shown and described, for example, in FIG. 3A.

At 506, an activity of the first individual 112*a* may be detected based on the at acquired one or more data items in absence of one or more remaining individuals of group of individuals 112 in first time period in defined area 114. The activity detector 206 may be configured to detect the activity of the first individual 112*a* in the first time period in the defined area 114 based on the at least one captured image received from the image-capture device 104A. The activity of the first individual 112*a* may be detected in an absence of one or more remaining individuals of the group of individuals 112 in the first time period in the defined area 114. An example of the detected activity of the first individual 112*a* has been shown and described, for example, in FIG. 3A.

At 508, the detected activity of the first individual 112*a* may be analyzed to determine whether the detected activity is in accordance with at least one of usual activities of the first individual 112*a* or a schedule plan of activities associated with the first individual 112*a*. The activity detector 206 may be configured to analyze the detected activity. One or more operations (such as 510 and 512) may be executed concurrently with one or more other operations (such as 514 and 516) as shown. Therefore control may pass concurrently to 510 and 514.

At 510, a first time duration taken by the first individual 112*a* to complete the analyzed activity may be measured. The activity detector 206 may be configured to measure the first time duration taken by the first individual 112*a* to complete the detected activity (wholly or up to a certain limit). In some embodiments, the schedule plan of activities (stored in the memory 204) may comprise one or more time constants which correspond to one or more time limits for completion (wholly or up to a certain limit) of one or more activities (such as the detected activity) by the first individual 112*a*. The activity detector 206 may be configured to compare the measured first time duration with a first time limit associated with the detected activity.

At 512, the time deviation parameter may be determined based on difference between the measured first time duration and the first time limit. The activity detector 206 may be configured to determine the time deviation parameter based on difference between the measured first time duration and the first time limit.

At 514, a first behavior pattern exhibited by the first individual 112*a* engaged in the analyzed activity may be determined. The emotion generator 208 may be configured to determine a first behavior pattern exhibited by the first individual 112*a* while the first individual 112*a* performs the detected activity. The memory 204 may store a first baseline behavior pattern associated with the first individual 112*a*. The activity detector 206 may be further configured to compare the first behavior pattern and the first baseline behavior pattern.

At 516, a behavior deviation parameter (of the first individual 112*a* while the first individual 112*a* is engaged in the detected activity) may be determined based on a difference between the first behavior pattern and the first baseline behavior pattern. The activity detector 206 may be configured to determine the behavior deviation parameter of the first individual 112*a*.

At 518, an emotional state of the first individual 112a may be determined based on the detected activity. The emotion generator 208 may be configured to determine the emotional state of the first individual 112a based on the analyzed activity. In certain scenarios, the emotion generator 208 may be configured to determine the emotional state based on the determined time deviation parameter and the determined behavior deviation parameter of the first individual 112a. An example of the emotional state of the first individual 112a has been shown and described, for example, in FIGS. 3A and 3B.

At 520, it may be checked whether an assistance is required for the first individual 112a in the defined area 114. The activity detector 206 may be configured to determine the requirement of the assistance for the first individual 112a based on the detected activity in the defined area 114. For example, the requirement of the assistance for the first individual 112a in the defined area 114 may be determined based on the emotional state of the first individual 112a at the time of the detected activity. In accordance with an embodiment, the activity detector 206 may determine that an assistance is required for the first individual 112a in the defined area 114 based on the emotional state, the time deviation parameter and/or the behavior deviation parameter. In cases, where the assistance is required for the first individual 112a in the defined area 114, control passes to 522, else the control passes to 530.

At 522, a second individual (such as the second individual 112b) may be identified from the group of individuals 112. The second individual, who is different from the first individual 112a, may be identified from the group of individuals 112 based on a dynamic association of the detected activity of the first individual 112a with the second individual. For example, one of the remaining individuals, such as the individuals 112b to 112d, of the group of individuals 112, may be identified as most emotionally attached or influential individual for the first individual 112a for that detected activity based on historical data and learned data from the VRT 212.

At 524, an emotional reaction of the second individual may be computed for the determined requirement of the assistance for the first individual 112a. The emotion generator 208 may be configured to compute the emotion reaction (or predict a likely emotional reaction of the second individual) based on the detected activity of the first individual 112a.

At 526, an output voice similar to the second individual may be generated to provide a personalized assistance to the first individual 112a. The voice generator 210 may be configured to generate the output voice similar to a voice of the second individual based on at least the computed emotional reaction. The output voice may be further generated based on a voice footprint of the second individual stored in a storage server, for example, the memory 204. The voice footprint of the second individual may correspond to a second time period that precedes the first time period. Further, the voice footprint of the second individual may be associated with an activity similar to the detected activity of the first individual 112a. An example of the generated voice output has been shown and described, for example, in FIG. 3B.

At 528, predictive content and an activity report may be generated. The content generator 214 may be configured to generate the predictive content for the detected activity of the first individual 112a based on activities of each individual of the group of individuals 112. Further, at least one of the group of individuals 112 who is related to the detected activity of the first individual 112a may be identified based on the activities of remaining individuals of the group of individuals 112. The content generator 214 may be further configured to generate the activity report that includes an influence of the detected activity on at least one of the remaining individuals of the group of individuals 112. The activity report may further include the emotion reaction corresponding to the detected activity. The control passes to the end 532.

At 530, the personalized voice assistance system 102 may be trained based on the analyzed data. The VRT 212 may be configured to train the personalized voice assistance system 102. Exemplary operations for training the personalized voice assistance system 102 for generating emotion-based voice for the personalized assistance of the first individual 112a have been shown and described, for example, in FIG. 4. The control passes to the end 532.

In accordance with an embodiment of the disclosure, a personalized voice assistance system to generate emotion-based voice for personalized assistance of an individual is disclosed. The personalized voice assistance system 102 (shown in FIG. 1), may comprise circuitry. The circuitry may correspond to, for example, the image processor 202, the activity detector 206, the emotion generator 208, the voice generator 210, the VRT 212, and the content generator 214 (shown in FIG. 2). The circuitry may be configured to detect an activity of a first individual 112a from a group of individuals in a first time period in a defined area 114. The circuitry may be further configured to determine a requirement of an assistance for the first individual 112a based on the detected activity in the defined area 114. The circuitry may be further configured to compute, based on the detected activity, an emotional reaction of a second individual from the group of individuals 112 for the determined requirement of the assistance for the first individual 112a. The circuitry may be further configured to generate an output voice similar to the second individual based on at least the computed emotional reaction to assist the first individual 112a.

The personalized voice assistance system 102 may find application in a smart home system to provide a personalized assistance to a first individual 112a in a defined area 114 of the smart home in an absence of a second individual in the defined area 114. The first individual 112a may be assisted based on an output voice generated by the personalized voice assistance system 102.

The generated output voice may correspond to a voice that includes an emotion reaction and a voice pitch of the second individual, and hence, is similar to the voice of the second individual. Such generated emotion-based voice may enable the first individual 112a to feel as if the second individual is around (nearby to the first individual 112a) in the defined area 114. Therefore, the reproduction of the generated emotion-based voice in the defined area 114 may make the first individual 112a more comfortable and confident in the defined area 114.

The reproduction of the generated emotion-based voice may help the first individual 112a complete an ongoing activity on time. Further, having implemented the personalized voice assistance system 102 in a smart home system, the smart home system may include a virtual voice footprint of all individuals of the group of individuals 112 associated with the smart home, for example, all of the family members of the smart home. Thus, in comparison to a conventional voice assistance method where all individuals of the group of individuals 112 are assisted in a predefined voice (i.e., a same type of voice or a repetitive audio) based on a pre-defined text data, the personalized voice assistance system 102 may assist the first individual 112a in different voices with different emotion reactions that are similar to remaining individuals of the group of individuals 112 based on the detected activity of the first individual 112a. For example, in an absence of a mother in a dining hall where a kid is having breakfast, the kid may hear a mother's voice with anger (generated by the personalized voice assistance system 102) when the kid is delaying in the breakfast. In another example, where kids need to be assisted for going to play, a father's voice with joy (generated by the personalized voice assistance system 102) may be heard by the kids even though the father is not present around. Therefore, the implementation of such personalized voice assistance system 102 in the smart home may provide an enhanced and much more effective user experience to the group of individuals 112.

Various embodiments of the disclosure may provide a non-transitory, computer readable medium and/or storage medium, and/or a non-transitory machine readable medium and/or storage medium stored thereon, a machine code and/or a computer program with at least one code section executable by a machine and/or a computer for generating emotion-based voice for personalized assistance of an individual. The at least one code section may cause the machine and/or computer to perform the operations that comprise detecting an activity of a first individual 112a from a group of individuals in a first time period in a defined area 114. The at least one code section in the personalized voice assistance system 102 may cause the machine and/or computer to perform the operations that comprise determining a requirement of an assistance for the first individual 112a based on the detected activity in the defined area 114. The at least one code section in the personalized voice assistance system 102 may cause the machine and/or computer to perform the operations that further comprise computing, based on the detected activity, an emotional reaction of a second individual from the group of individuals 112 for the determined requirement of the assistance for the first individual 112a. The at least one code section in the personalized voice assistance system 102 may cause the machine and/or computer to perform the operations that further comprise generating an output voice similar to the second individual based on at least the computed emotional reaction to assist the first individual 112a.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A personalized voice assistance system, comprising:
a plurality of sensors configured to acquire at least one data item associated with a first individual of a group of individuals; and
circuitry configured to:
detect an activity of the first individual from the group of individuals in real time or near-real time based on the at least one data item acquired in an absence of at least one remaining individual of the group of individuals in a first time period in a defined area;
determine a requirement of an assistance for the first individual based on the detected activity and the absence of the at least one remaining individual of the group of individuals in the first time period in the defined area;
compute an emotional reaction of a second individual from the group of individuals based on the detected activity,
wherein the emotional reaction of the second individual is computed for the determined requirement of the assistance for the first individual; and
generate an output voice similar to a voice of the second individual based on the computed emotional reaction of the second individual and the absence of the at least one remaining individual of the group of individuals in the first time period in the defined area, wherein the output voice is generated to assist the first individual.

2. The personalized voice assistance system according to claim 1, wherein
the circuitry is further configured to receive, via a communication network, the acquired at least one data item from the plurality of sensors, and
the acquired at least one data item comprises at least one image of the first individual or an audio stream associated with the first individual.

3. The personalized voice assistance system according to claim 1, wherein the circuitry is further configured to:
analyze the detected activity of the first individual; and
determine whether the detected activity of the first individual is in accordance with at least one of usual activities of the first individual or a schedule plan of activities associated with the first individual based on the analysis of the detected activity.

4. The personalized voice assistance system according to claim 1, further comprising a memory configured to store a first time constant which corresponds to a first time limit for completion of the activity by the first individual, wherein the circuitry is further configured to:
measure a first time duration taken by the first individual to complete the activity; and determine a time deviation parameter associated with the first individual based on a difference between the first time limit and the first time duration.

5. The personalized voice assistance system according to claim 4, wherein
the memory is further configured to store a first data item which corresponds to a first baseline behavior pattern of the first individual, and
the circuitry is further configured to:
determine a first behavior pattern exhibited by the first individual engaged in the activity; and
determine a behavior deviation parameter associated with the first individual based on a difference between the first baseline behavior pattern and the first behavior pattern.

6. The personalized voice assistance system according to claim 5, wherein the circuitry is further configured to:
determine an emotional state of the first individual based on the analyzed activity, the determined time deviation parameter associated with the first individual, and the determined behavior deviation parameter associated with the first individual; and
determine the requirement of the assistance for the first individual in the defined area based on the emotional state of the first individual, the time deviation parameter associated with the first individual, and the behavior deviation parameter associated with the first individual.

7. The personalized voice assistance system according to claim 1, wherein the circuitry is further configured to identify the second individual from the group of individuals based on a dynamic association of the detected activity of the first individual with the second individual.

8. The personalized voice assistance system according to claim 1, wherein the circuitry is further configured to generate the output voice similar to the voice of the second individual based on a voice footprint of the second individual, wherein
the voice footprint of the second individual is retrieved from a storage server via a communication network, and
the voice footprint of the second individual corresponds to a second time period that precedes the first time period.

9. The personalized voice assistance system according to claim 1, wherein the circuitry is further configured to monitor a voice footprint of each individual of the group of individuals in a second time period that precedes the first time period based on activities of each individual of the group of individuals in the second time period in the defined area.

10. The personalized voice assistance system according to claim 9, wherein the circuitry is further configured to:
train the personalized voice assistance system based on the monitored voice footprint of each individual of the group of individuals; and
recognize a voice of each individual of the group of individuals based on the trained personalized voice assistance system.

11. The personalized voice assistance system according to claim 10, wherein
the circuitry is further configured to train the personalized voice assistance system based on a custom machine learning system, and
the custom machine learning system is configured for emotion-based voice generation to assist the first individual.

12. The personalized voice assistance system according to claim 1, wherein the circuitry is further configured to generate a predictive content for the detected activity of the first individual based on activities of each individual of the group of individuals.

13. The personalized voice assistance system according to claim 12, wherein the circuitry is further configured to identify at least one individual of the group of individuals, related to the detected activity of the first individual, based on the activities of the at least one remaining individual of the group of individuals.

14. The personalized voice assistance system according to claim 12, wherein the circuitry is further configured to generate an activity report that includes an influence of the detected activity associated with the first individual on the at least one remaining individual of the group of individuals.

15. The personalized voice assistance system according to claim 14, wherein the generated activity report further includes the emotional reaction corresponding to the detected activity.

16. A personalized voice assistance method, comprising:
acquiring, from a plurality of sensors, at least one data item associated with a first individual of a group of individuals;
detecting, by circuitry, an activity of the first individual from the group of individuals in one of a real time or a near-real time based on the at least one data item acquired in an absence of at least one remaining individual of the group of individuals in a first time period in a defined area;
determining, by the circuitry, a requirement of an assistance for the first individual based on the detected activity and the absence of the at least one remaining individual of the group of individuals in the first time period in the defined area;
computing, by the circuitry, an emotional reaction of a second individual from the group of individuals based on the detected activity,
wherein the emotional reaction of the second individual is computed based on the determined requirement of the assistance for the first individual; and
generating, by the circuitry, an output voice similar to a voice of the second individual based on the computed emotional reaction of the second individual and the absence of the at least one remaining individual of the group of individuals in the first time period in the defined area,
wherein the output voice is generated to assist the first individual.

17. The personalized voice assistance method according to claim 16, further comprising,
analyzing, by the circuitry, the detected activity of the first individual; and
determining, by the circuitry, whether the detected activity of the first individual is in accordance with at least one of usual activities of the first individual or a schedule plan of activities associated with the first individual based on the analysis of the detected activity.

18. The personalized voice assistance method according to claim 16, further comprising:
storing, by the circuitry in a memory, a first time constant which corresponds to a first time limit for completion of the activity by the first individual;
measuring, by the circuitry, a first time duration taken by the first individual to complete the analyzed activity; and determining, by the circuitry, a time deviation parameter associated with the first individual based on a difference between the first time limit and the first time duration.

19. The personalized voice assistance method according to claim 18, further comprising:
   storing, by the circuitry in the memory, a first baseline behavior pattern of the first individual;
   determining, by the circuitry, a first behavior pattern exhibited by the first individual engaged in the activity; and
   determining, by the circuitry, a behavior deviation parameter associated with the first individual based on a difference between the first baseline behavior pattern and the first behavior pattern.

20. The personalized voice assistance method according to claim 19, further comprising determining, by the circuitry, an emotional state of the first individual based on the activity, the time deviation parameter associated with the first individual, and the behavior deviation parameter associated with the first individual,
   wherein the requirement for assisting the first individual is determined based on at least one of the emotional state of the first individual, the determined time deviation parameter associated with the first individual, or the determined behavior deviation parameter associated with the first individual.

21. The personalized voice assistance method according to claim 16, wherein
   the output voice similar to the voice of the second individual is generated based on a voice footprint of the second individual, and
   the voice footprint of the second individual corresponds to a second time period that precedes the first time period.

22. The personalized voice assistance method according to claim 16, further comprising training, by the circuitry, a personalized voice assistance system based on a custom machine learning system,
   wherein the custom machine learning system is configured for emotion-based voice generation to assist the first individual.

* * * * *